(12) United States Patent  (10) Patent No.: US 7,868,551 B2
Takata                    (45) Date of Patent:    Jan. 11, 2011

(54) FLUORESCENT TUBE HAVING AN INCREASING INTERNAL DIAMETER, A METHOD OF DRIVING THE FLUORESCENT TUBE, AN ILLUMINATING DEVICE FOR DISPLAY DEVICE, AND A DISPLAY DEVICE HAVING THE ILLUMINATING DEVICE

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 368 days.

(21) Appl. No.: 11/911,361

(22) PCT Filed: Feb. 17, 2006

(86) PCT No.: PCT/JP2006/302811

§ 371 (c)(1),
(2), (4) Date: Jun. 20, 2008

(87) PCT Pub. No.: WO2006/112127

PCT Pub. Date: Oct. 26, 2006

(65) Prior Publication Data

US 2009/0072753 A1    Mar. 19, 2009

(30) Foreign Application Priority Data

Apr. 14, 2005  (JP) ............................. 2005-116737

(51) Int. Cl.
    *H01J 17/04* (2006.01)
(52) U.S. Cl. ..................... 313/621; 313/623; 313/631; 313/234; 313/634
(58) Field of Classification Search ......... 313/623–627, 313/631, 634–637, 238–244, 249–255, 621, 313/234
See application file for complete search history.

(56) References Cited

U.S. PATENT DOCUMENTS

| 1,517,466 | A |   | 12/1924 | Schaller et al. |
| 2,053,879 | A | * | 9/1936 | Spanner et al. ............. 315/336 |
| 2,148,017 | A |   | 2/1939 | Germer |
| 2,190,657 | A |   | 2/1940 | Germer |
| 4,868,450 | A |   | 9/1989 | Colterjohn, Jr. |

(Continued)

FOREIGN PATENT DOCUMENTS

GB    1 424 102    2/1976

(Continued)

OTHER PUBLICATIONS

Official communication issued in the International Application No. PCT/JP2006/302811, mailed on May 23, 2006.

*Primary Examiner*—Tuyet Thi Vo
(74) *Attorney, Agent, or Firm*—Keating & Bennett, LLP

(57) ABSTRACT

A fluorescent tube in which no luminance gradient in the longitudinal direction occurs even when a one-side high-voltage driving method is used, a method of driving the fluorescent tube, an illuminating device for display device, and a display device having the illuminating device are provided. The fluorescent tube for one-side high-voltage driving is arranged behind a display panel via optical sheets. An internal diameter of the fluorescent tube is arranged to become larger gradually toward an electrode part at a high-voltage driving side, which prevents the occurrence of the luminance gradient in the longitudinal direction when a one-side high-voltage driving method is used.

8 Claims, 12 Drawing Sheets

U.S. PATENT DOCUMENTS

| | | | |
|---|---|---|---|
| 5,013,966 A * | 5/1991 | Saikatsu et al. | 313/493 |
| 6,956,556 B2 | 10/2005 | Yajima et al. | |
| 2004/0239260 A1 | 12/2004 | Nakano | |
| 2005/0168149 A1 * | 8/2005 | Hiramoto et al. | 313/636 |

FOREIGN PATENT DOCUMENTS

| | | |
|---|---|---|
| JP | 47-31343 U | 12/1972 |
| JP | 49-136085 U | 11/1974 |
| JP | 60-240049 A | 11/1985 |
| JP | 05-004133 U | 1/1993 |
| JP | 07-020463 A | 1/1995 |
| JP | 2003-331785 A | 11/2003 |
| JP | 2004-039264 A | 2/2004 |

* cited by examiner

FLUORESCENT TUBE HAVING AN INCREASING INTERNAL DIAMETER, A METHOD OF DRIVING THE FLUORESCENT TUBE, AN ILLUMINATING DEVICE FOR DISPLAY DEVICE, AND A DISPLAY DEVICE HAVING THE ILLUMINATING DEVICE

BACKGROUND OF THE INVENTION

1. Field of the Invention

The present invention relates to a fluorescent tube which is preferably used as a light source of a display device with a backlight.

2. Description of the Related Art

A liquid crystal display device including a liquid crystal display panel, which is cited as an example of a display device, generally has an illuminating device for a display device arranged behind or at a display surface side of the liquid crystal display panel. The illuminating device for a display device includes a fluorescent tube such as a cold cathode tube that is a light source, and controls the properties of light emitted from the fluorescent tube and projects the light toward a rear side of the display panel. The projected light passes through or is reflected by the display panel, making an image displayed visible on a front side of the display panel.

FIG. 11 is an exploded perspective view illustrating relevant parts of a structure of a generally-used conventional liquid crystal display device. A liquid crystal display device 20 includes a bezel 2, a display panel 3 and an illuminating device 4. The bezel 2 is a member that defines a frame of the display panel 3, and the display panel 3 is made by bonding two panels of glass to seal in a liquid crystal therebetween.

The illuminating device 4 includes a frame 5, optical sheets 6, fluorescent tubes 21, a reflector 10, a backlight chassis 11, side holders 12 and an inverter circuit board 13. The frame 5 is shaped like a picture frame and secures the optical sheets 6 to support surfaces of the backlight chassis 11 and the side holders 12. The optical sheets 6 are for controlling the properties of light which enters the display panel 3 from the fluorescent tubes 21, and are made of, for example, a diffusion sheet, a lens sheet, a polarizing reflection sheet and a diffusion plate.

Both ends of the fluorescent tubes 21 are inserted into electrode part holders 15 and 16 so as to be secured to the backlight chassis 11. The reflector 10 which is laid under the fluorescent tubes 21 is for reflecting the light emitted from the fluorescent tubes 21 toward the display panel 3. The backlight chassis 11 and the side holders 12 are members that define a fluorescent tube housing which houses the fluorescent tubes 21 in parallel. In this case, the backlight chassis 11 is made from a metal plate material, which is subjected to plate metal processing so as to be shaped like a box, and constitutes a bottom portion and side-wall portions at the longer edges of the fluorescent tube housing. The side holders 12 are members made from a white resin material and constitute side-wall portions at the shorter edges of the fluorescent tube housing.

On the rear surface of the backlight chassis 11, the inverter circuit board 13 which generates high pulse voltage to drive the fluorescent tubes 21 and an inverter circuit board cover 13a which is arranged to cover the inverter circuit board 13 are placed. In addition, a control circuit board 14 which controls the display panel 3 and a control circuit board cover 14a which is arranged to cover the control circuit board 14 are placed on the rear surface of the backlight chassis 11.

Incidentally, as a prior art literature relating to the present invention, Japanese Utility Model Application Unexamined Publication No. Hei 05-4133 and Japanese Patent Application Unexamined Publication No. Hei 07-20463 are cited.

As shown in FIG. 12, in the illuminating device 4 for display device, the fluorescent tube 21 that is the light source employs a one-side high-voltage driving method with the use of the inverter circuit board 13 in which an electrode part holder 15 side is set to be a high-voltage driving side 8, and an electrode part holder 16 side is set to be a low-voltage driving side 9. The backlight chassis 11 made from metal usually is at a ground potential. When the thus-configured fluorescent tubes 21 are driven, the backlight chassis 11 functions as an adjacent conductor and stray capacitances "Cs" are generated between the fluorescent tubes 21 and the backlight chassis 11. Accordingly, a current passing through the fluorescent tubes 21 partly leaks to the backlight chassis 11 functioning as the adjacent conductor so as to be a leakage current "is". Generally, the leakage current "is" increases as the lengths of the fluorescent tubes 21 increase, resulting in current differences between the high-voltage driving side 8 and the low-voltage driving side 9, and thereby a luminance gradient occurs in the fluorescent tubes 21 such that the luminance becomes lower from the high-voltage driving side 8 toward the low-voltage driving side 9.

In recent years, accompanied by increases in the size of a screen for a liquid crystal display device used in a liquid crystal television set, the lengths of fluorescent tubes that are light sources increase to cause such a problem that the luminance gradient in the fluorescent tubes as described above appears as a brightness difference between right and left portions on the display screen.

SUMMARY OF THE INVENTION

In order to overcome the problems described above, preferred embodiments of the present invention provide a fluorescent tube in which no luminance gradient in the longitudinal direction occurs even when a one-side high-voltage driving method is used, a method of driving the fluorescent tube, an illuminating device for a display device having the fluorescent tube, and a display device having the illuminating device for a display device.

It is known that even if fluorescent tubes are different in their internal diameter, the diameters of positive columns (plasma) passing through the tubes are about the same if the fluorescent tubes have the same gas pressure because of a tube's structure. In addition, it is known that plasma and a fluorescent material coated on the inside of a fluorescent tube glow brighter as the plasma and the fluorescent material come closer to each other. In consideration of these facts, the present inventor discovered that changing a tube's internal diameter in the longitudinal direction allows the brightness of the fluorescent tube to vary in the longitudinal direction. Hence, in order to overcome the problems described above, a fluorescent tube for one-side high-voltage driving according to a preferred embodiment of the present invention includes a pair of electrode parts, wherein an internal diameter of the fluorescent tube is arranged to become larger gradually toward the electrode part at a high-voltage driving side.

In this case, it is preferable that the electrode part at the smaller-diameter side is arranged to be larger than the electrode part at the larger-diameter side. In addition, it is preferable that the electrode part at the smaller-diameter side is arranged to be larger in length not in diameter than the electrode part at the larger-diameter side.

In addition, a fluorescent tube for both-side high-voltage driving according to another preferred embodiment of the present invention includes a pair of electrode parts, wherein an internal diameter of the fluorescent tube is arranged to become larger gradually from a center portion of the fluorescent tube toward the electrode parts at both ends.

A method of driving the fluorescent tube for the one-side high-voltage driving includes electrically connecting the electrode parts of the fluorescent tubes in pairs at the smaller-diameter sides, and connecting the electrode parts of the fluorescent tubes at the larger-diameter sides respectively to power sources for high-voltage driving.

In this case, it may be configured so that a connecting portion, by which the electrode parts of the fluorescent tubes in pairs at the smaller-diameter sides are electrically connected, is prevented from being grounded to a ground potential. In addition, it may be configured so that the power sources for high-voltage driving, to which the electrode parts at the larger-diameter sides are respectively connected, have opposite phases.

It is preferable that an illuminating device for the display device is configured to include the above-described fluorescent tubes and optical sheets, wherein the fluorescent tubes are arranged behind a display panel via the optical sheets. In addition, it is preferable that a display device is configured to include the illuminating device.

According to the fluorescent tube for one-side high-voltage driving having the above-described configuration, since the internal diameter of the fluorescent tube is arranged to become larger gradually toward the electrode part at the high-voltage driving side, a luminance gradient can be generated in the fluorescent tube such that the luminance becomes higher from the high-voltage driving side toward the low-voltage driving side if a leakage current leaking to an adjacent conductor such as a backlight chassis as explained in the Description of the Related Art is not generated. To be more specific, by making the luminance gradient generated by the internal diameter difference and a luminance gradient generated by a leakage current which is generated when there is an adjacent conductor cancel out each other, the luminance distribution in the longitudinal direction can be evened out even when the one-side high-voltage driving method is used.

In this case, when the fluorescent tube is configured so that the electrode part at the smaller-diameter side is arranged to be larger than the electrode part at the larger-diameter side, the life of a sputtered film on the electrode part at the smaller-diameter side can be prevented from being shortened under the influence of current density, whereby problems accompanied by the reduced diameter can be resolved. Further, when the fluorescent tube is configured so that the electrode part at the smaller-diameter side is arranged to be larger in length not in diameter than the electrode part at the larger-diameter side, reduction of the internal diameter of the fluorescent tube can be easily achieved.

According to the fluorescent tube for both-side high-voltage driving having the above-described configuration, since the internal diameter is arranged to become larger gradually from the center portion of the fluorescent tube toward the electrode parts at both ends, a problem such that the luminance at the center portion of the fluorescent tube becomes lower than the luminance at both ends can be prevented, whereby the luminance distribution in the longitudinal direction can be evened out even when the both-side high-voltage driving method is used.

According to the method of driving the fluorescent tube for one-side high-voltage driving having the above-described configuration, since the method includes electrically connecting the electrode parts of the fluorescent tubes in pairs at the smaller-diameter sides, and connecting the electrode parts of the fluorescent tubes at the larger-diameter sides respectively to the power sources for high-voltage driving, the luminance distribution in the longitudinal direction can be evened out even when the two fluorescent tubes are connected and driven in a both-side high-voltage driving method.

In this case, when the connecting portion, by which the electrode parts in pairs at the smaller-diameter sides are electrically connected, is configured to be prevented from being grounded to the ground potential, the luminance distribution in the longitudinal direction can be evened out even when the two fluorescent tubes are connected so as to form a so-called pseudo U-shaped tube and driven in the both-side high-voltage driving method. In addition, when the power sources for high-voltage driving, to which the electrode parts at the larger-diameter sides are respectively connected, are configured to have opposite phases, electric fields of the two fluorescent tubes are cancelled out by each other, whereby the fluorescent tubes are prevented from becoming a noise source.

Therefore, according to the fluorescent tube included as a light source in the illuminating device for a display device, and the illuminating device for a display device included in the display device, a problem of a brightness difference appearing between right and left portions on a display screen of the display device is precluded.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
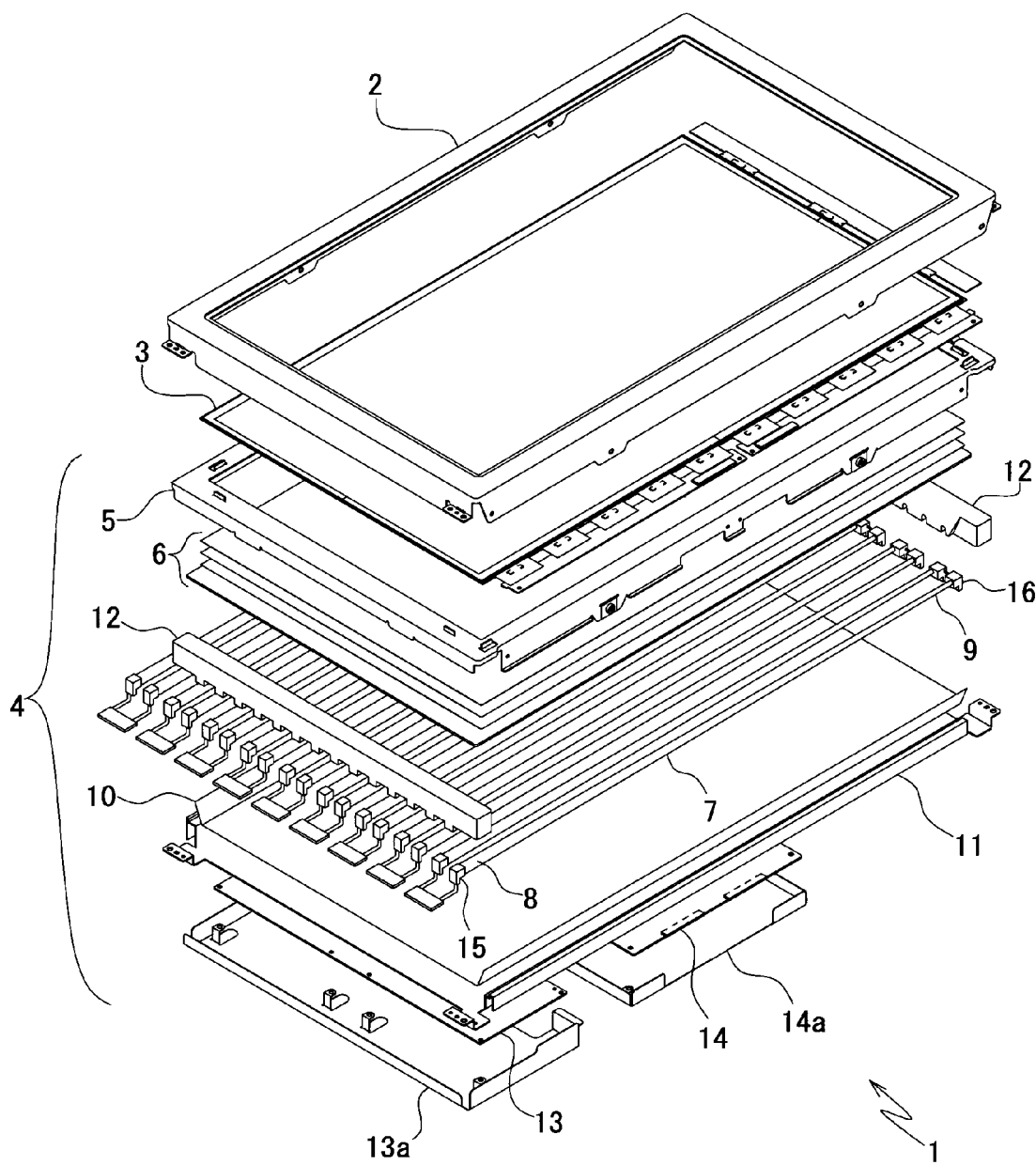
FIG. 1 is an exploded perspective view illustrating a liquid crystal display device according to a preferred embodiment of the present invention.
Figure 2:
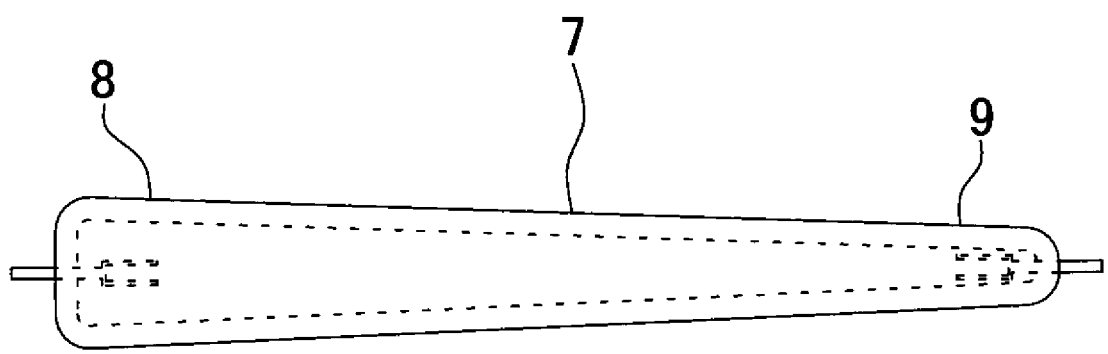
FIG. 2 is a schematic view illustrating a fluorescent tube according to a preferred embodiment of the present invention included in the liquid crystal display device shown in FIG. 1.

A detailed description of a display device according to preferred embodiments of the present invention will now be provided with reference to the accompanying drawings. FIG. 1 is an exploded perspective view illustrating relevant parts of a structure of a liquid crystal display device according to a preferred embodiment of the present invention. FIG. 2 is a schematic view illustrating a fluorescent tube shown in FIG. 1.

Figure 3:
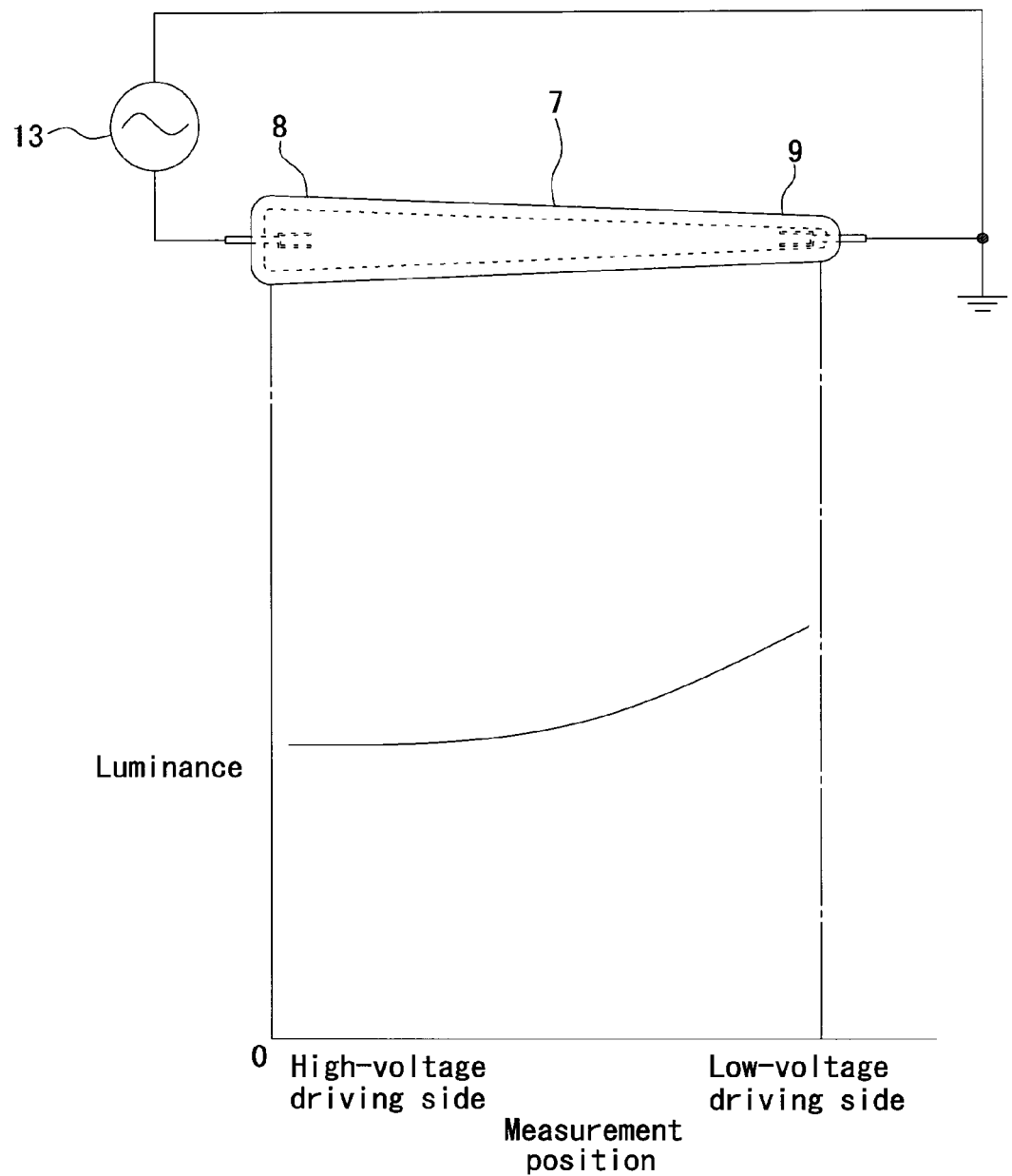
FIG. 3 is a view showing the luminance distribution in the longitudinal direction when the fluorescent tube shown in FIG. 2 is driven in a one-side high-voltage driving method in a state where there is no adjacent conductor (backlight chassis).
Figure 4:
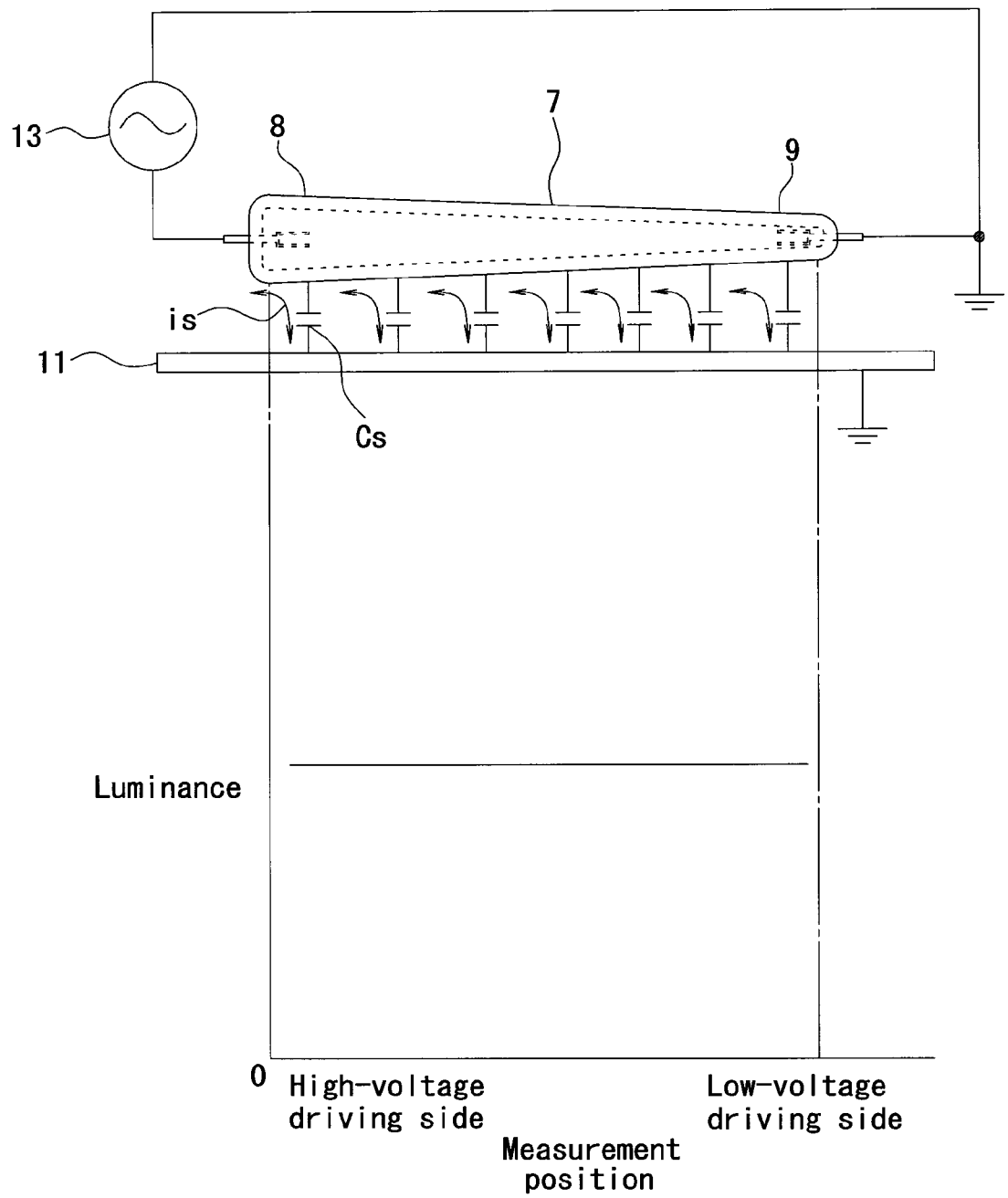
FIG. 4 is a view showing the luminance distribution in the longitudinal direction when the fluorescent tube shown in FIG. 2 is driven in the one-side high-voltage driving method in a state where there is an adjacent conductor (backlight chassis).
Figure 5A:
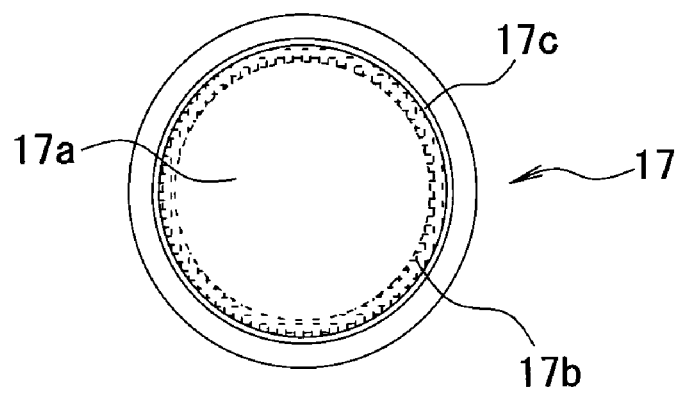
FIGS. 5A and 5B are sectional views illustrating two fluorescent tubes with internal diameters different from each other, which are presented for explaining a principle which formed the inspiration for the present invention.
Figure 5B:
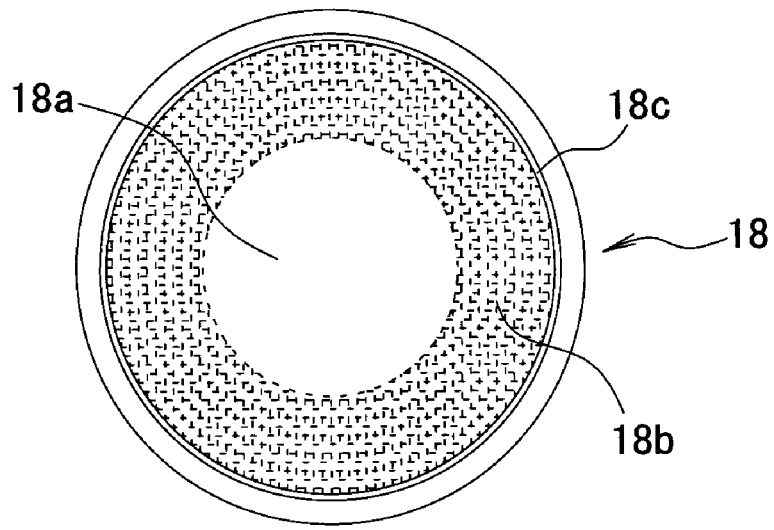
Figure 11:
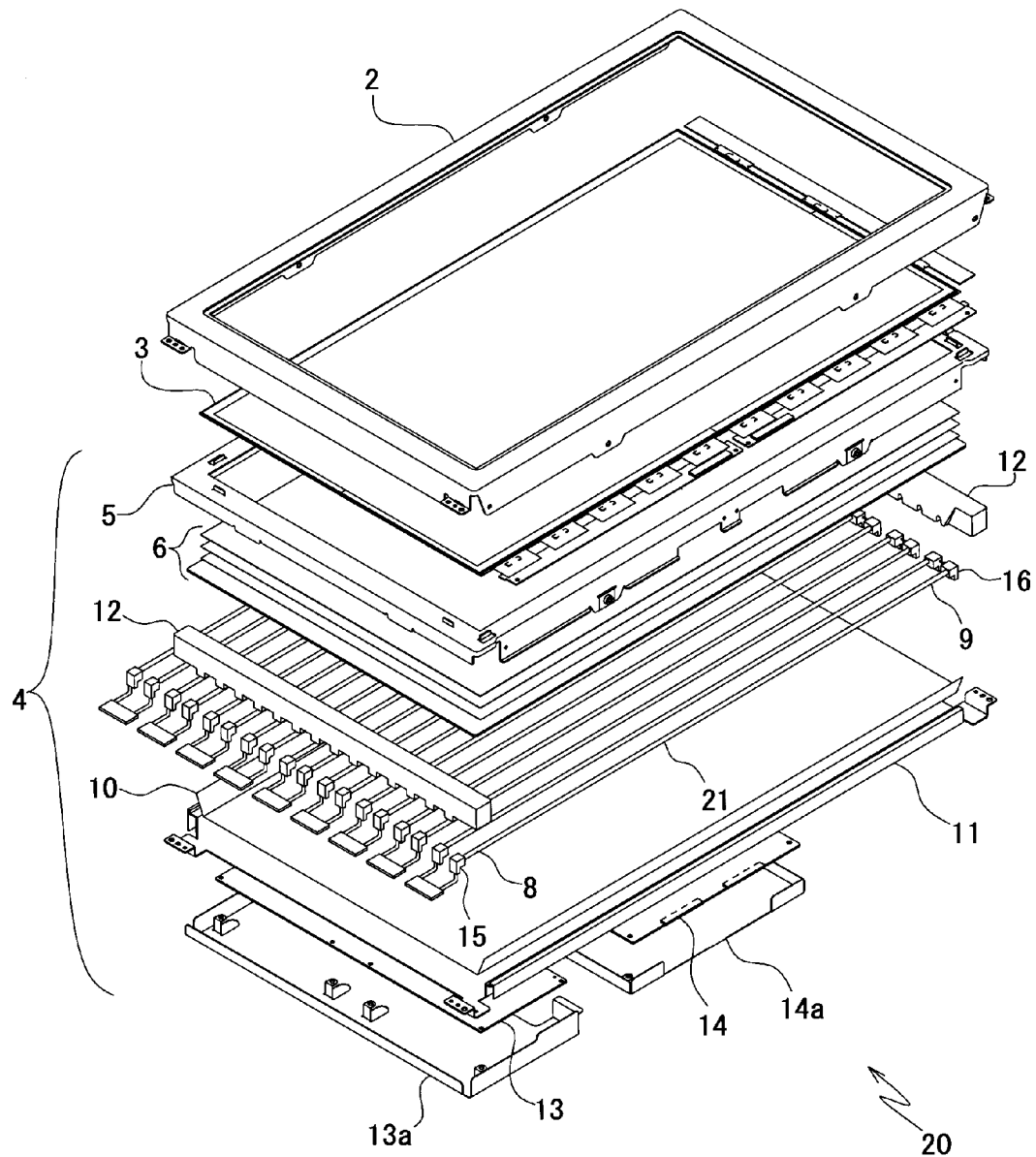
FIG. 11 is an exploded perspective view illustrating a liquid crystal display device which is conventionally used.
Figure 12:
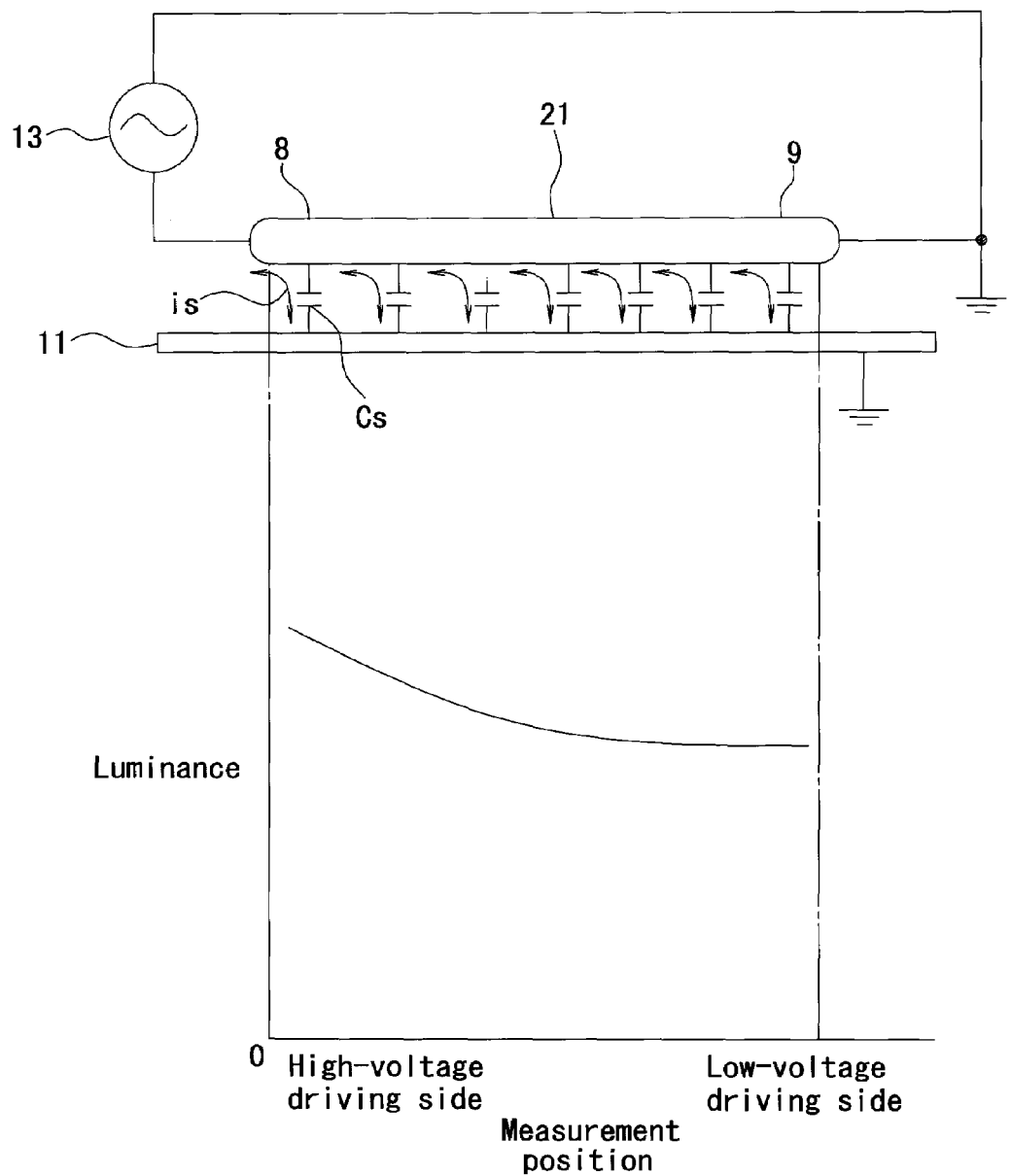
FIG. 12 is a view showing the luminance distribution in the longitudinal direction when the fluorescent tube shown in FIG. 11 is driven in the one-side high-voltage driving method.

FIG. 3 is a view showing the luminance distribution in the longitudinal direction when the fluorescent tube shown in FIG. 2 is driven in a one-side high-voltage driving method in a state where there is no adjacent conductor. FIG. 4 is a view showing the luminance distribution in the longitudinal direction when the fluorescent tube shown in FIG. 2 is driven in the one-side high-voltage driving method in a state where there is an adjacent conductor. FIGS. 5A and 5B are sectional views illustrating states when two fluorescent tubes different in the internal diameter and having the same gas pressure are driven. Incidentally, explanations of the same elements as those in the liquid crystal display device shown in FIG. 11 which are explained in the Description of the Related Art are omitted while providing the same reference numerals, and different respects are explained mainly.

As shown in FIGS. 5A and 5B, when fluorescent tubes 17 and 18 different in the internal diameter and having the same gas pressure are driven, the diameters of positive columns (plasma) 17a and 18a passing through the tubes are about the same, which is a generally known fact. In addition, an inert gas portion 18b of the fluorescent tube 18 shown in FIG. 5B which is not in a plasma state is thicker than an inert gas portion 17b of the fluorescent tube 17 shown in FIG. 5A which is not in a plasma state, so that the amount of ultraviolet light emitted in the positive column (plasma) 18a and absorbed by the inert gas portion 18b is larger than the amount of ultraviolet light emitted in the positive column (plasma) 17a and absorbed by the inert gas portion 17b so as to make a difference between the amounts of light reaching fluorescent materials 17c and 18c. This shows that the plasma and the fluorescent material coated on the inside of the fluorescent tube glow brighter as the plasma and the fluorescent material come closer to each other, which is also a generally known fact.

In consideration of these facts, the present inventor discovered that changing the tube's internal diameter in the longitudinal direction allows the brightness of the fluorescent tube to vary in the longitudinal direction. Hence, a fluorescent tube 7 according to the preferred embodiment of the present invention shown in FIG. 1 has an internal diameter which is arranged to become larger gradually from an electrode part at a low-voltage driving (smaller-diameter) side 9 toward an electrode part at a high-voltage driving (larger-diameter) side 8 as shown in FIG. 2.

When the fluorescent tube 7 shown in FIG. 2 is driven in the one-side high-voltage driving method in a state where there is no adjacent conductor such as a backlight chassis, a luminance gradient is made in the fluorescent tube 7 such that the luminance becomes higher from the high-voltage driving side 8 toward the low-voltage driving side 9 as shown in FIG. 3. Accordingly, when there is a backlight chassis 11 that defines an adjacent conductor, the luminance gradient made by the internal diameter difference and a luminance gradient generated by a leakage current "is" which is generated when there is the backlight chassis 11 can be cancelled out by each other, whereby the luminance distribution in the longitudinal direction can be evened out as shown in FIG. 4.

Therefore, even if the fluorescent tube 7 is driven in the one-side high-voltage driving method in the liquid crystal display device having a configuration such that the backlight chassis 11 functions as the adjacent conductor, the luminance gradient in the longitudinal direction can be suppressed, allowing a display panel 3 to be irradiated by the fluorescent tube 7 with the evened out luminance distribution.

Figure 6A:
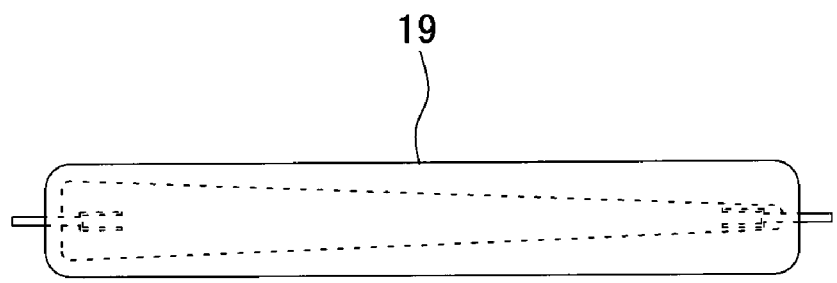
FIGS. 6A and 6B are views showing modified preferred embodiments of the fluorescent tube.
Figure 6B:
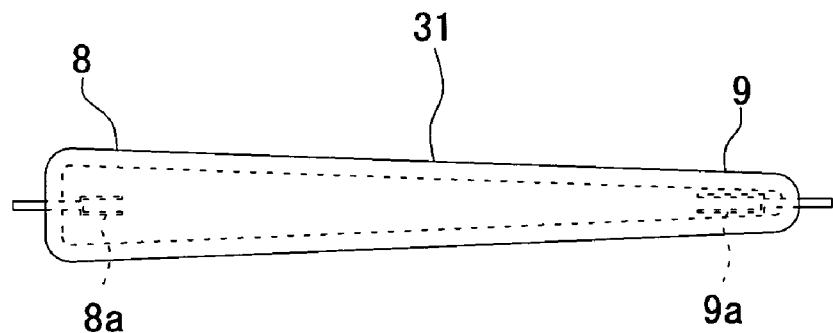

Incidentally, as shown as a fluorescent tube 19 in FIG. 6A, it may be configured that the internal diameter is arranged to become larger gradually toward one of electrodes and the external diameter is arranged not to change. In addition, as shown as a fluorescent tube 31 in FIG. 6B, it is preferable that the electrode part 9a at the smaller-diameter side 9 is arranged to be larger than the electrode part 8a at the larger-diameter side 8. This is because when a fluorescent tube is reduced in diameter, the life of a sputtered film on an electrode in a reduced-diameter section of the fluorescent tube is shortened under the influence of current density, that is, the life of an electrode usually depends on a physical size of the electrode, so that it is preferable for the electrode part 9a that is at the small-diameter side 9 and is supposed to have a short life to be arranged to become larger as shown in FIG. 6B. In this case, the fluorescent tube 31 is configured so that the electrode part 9a is arranged to be larger in length not in diameter than the electrode part 8a because the reduction of the internal diameter of the fluorescent tube 31 can be easily achieved by such a configuration.

Figure 7A:
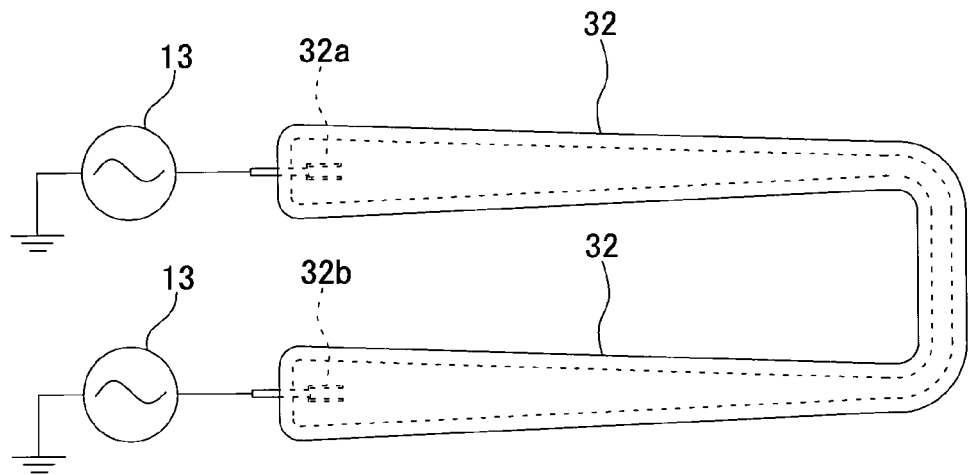
FIGS. 7A and 7B are schematic views illustrating fluorescent tubes for both-side high-voltage driving according to another preferred embodiment of the present invention.
Figure 7B:
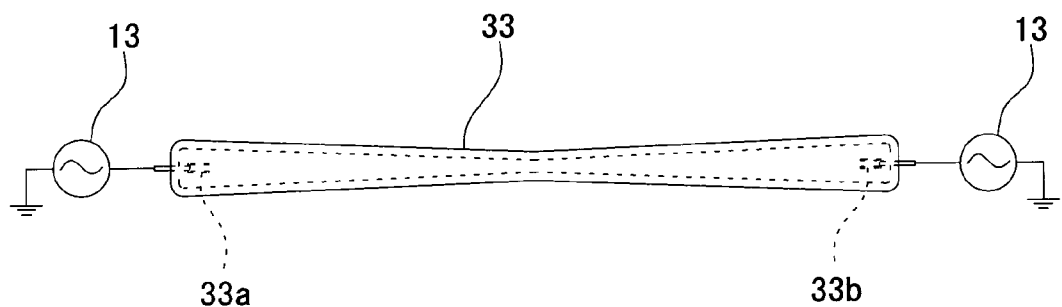

Next, descriptions of fluorescent tubes 32 and 33 shown in FIGS. 7A and 7B are provided. Different from the above-described fluorescent tubes for one-side high-voltage driving, the fluorescent tubes 32 and 33 are for both-side high-voltage driving as shown in FIGS. 7A and 7B. Such a fluorescent tube for both-side high-voltage driving also has the problem of the luminance gradient as described above. In general, it is known that a luminance gradient occurs in a fluorescent tube for both-side high-voltage driving such that the luminance becomes lower from both ends toward a center portion. Hence, the fluorescent tube 32 shown in FIG. 7A which is U-shaped is configured such that the internal diameter is arranged to become larger gradually from a center portion toward electrode parts 32a and 32b at both ends, whereby the luminance distribution in the longitudinal direction during driving can be evened out, as is the case with the above-described fluorescent tube 7. In addition, the fluorescent tube 33 shown in FIG. 7B which is linear-shaped is configured such that the internal diameter is arranged to become larger gradually from a center portion toward electrode parts 33a and 33b at both ends, whereby the luminance distribution in the longitudinal direction during driving can be evened out.

Figure 8A:
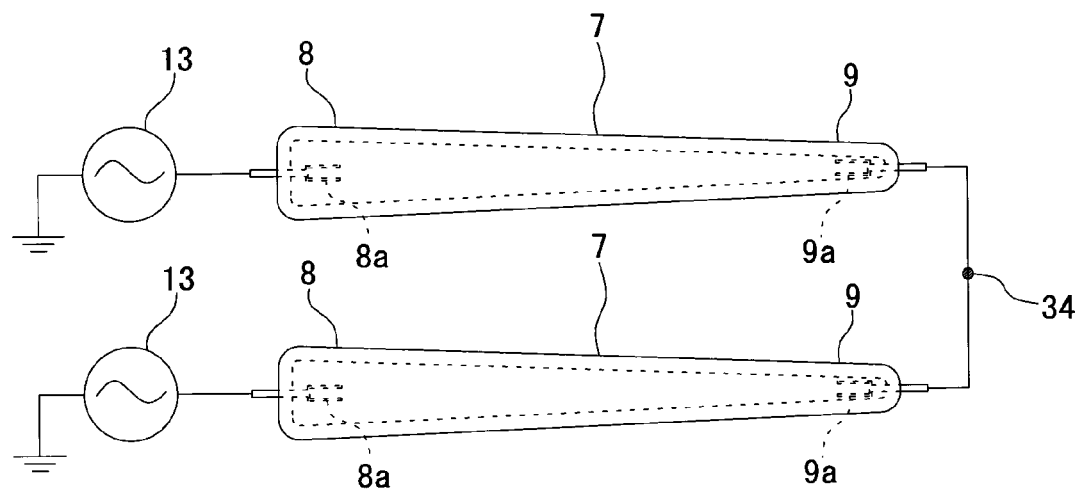
FIGS. 8A and 8B are views illustrating methods of driving the fluorescent tubes.
Figure 8B:
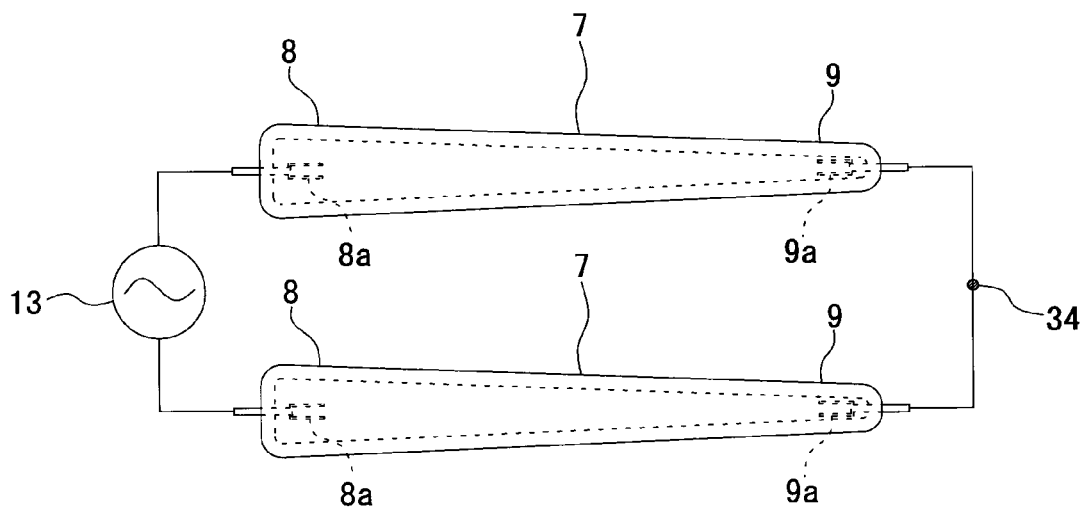

Next, descriptions of methods of driving the fluorescent tubes according to preferred embodiments of the present invention will now be provided with reference to FIGS. 8A and 8B, and 9A to 9C. These driving methods are for driving two of the fluorescent tubes 7 shown in FIG. 2 in the both-side high-voltage driving method. In FIG. 8A, a configuration is illustrated in which the two fluorescent tubes 7 and 7 are arranged in parallel so that the larger-diameter sides 8 and 8 and the smaller-diameter sides 9 and 9 are respectively aligned, and the electrode parts 9a and 9a at the smaller-diameter sides 9 and 9 are connected by a connecting portion 34. This configuration relates to a so-called pseudo U-shaped tube, which is driven in the both-side high-voltage driving method as is the case with a generally-used U-shaped fluorescent tube. In this case, the electrode parts 8a and 8a at the larger-diameter sides 8 and 8 are respectively connected to inverter circuit boards 13 and 13 that are power sources for driving. Since a potential of the connecting portion 34 by which the electrode parts 9a and 9a are connected conforms to that of the fluorescent tube 7 at the low-voltage driving side, the same effect as the above-described fluorescent tube 7 can be obtained, whereby the luminance distribution in the longitudinal direction of the fluorescent tubes 7 and 7 can be evened out. In addition, the same effect can be also obtained by a configuration as shown in FIG. 8B such that one inverter circuit board 13 is used as a power source for driving to which both the electrode parts 8a and 8a are connected. In addition, since the configuration shown in FIG. 8A is such that the power sources for high-voltage driving have opposite phases, electric fields of the two fluorescent tubes 7 and 7 are cancelled out by each other, whereby the fluorescent tubes 7 and 7 are prevented from becoming a noise source.

Figure 9A:
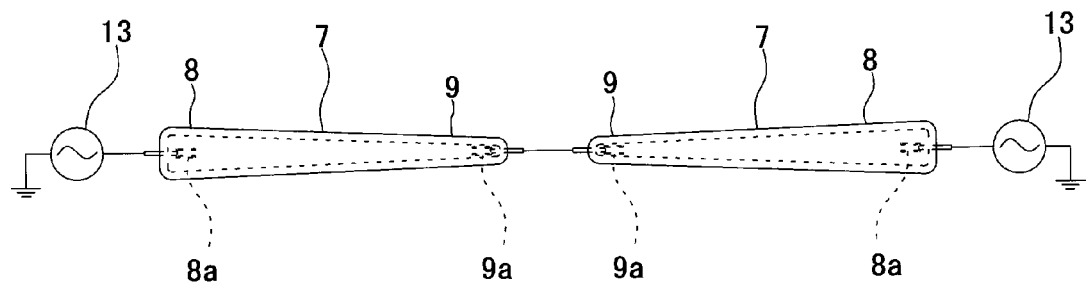
FIGS. 9A to 9C are views illustrating modified preferred embodiments of the methods of driving the fluorescent tubes.
Figure 9B:
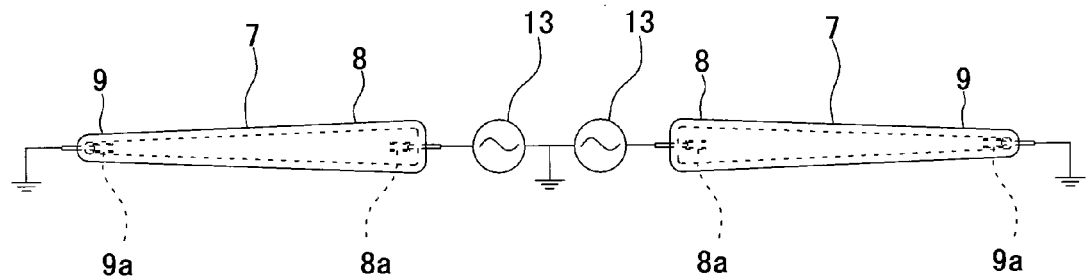
Figure 9C:
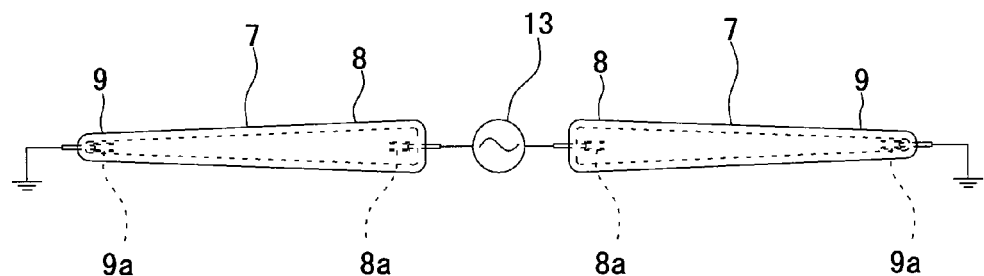

In FIGS. 9A to 9C, configurations are illustrated in which the fluorescent tubes 7 and 7 are arranged in series. In FIG. 9A, the fluorescent tubes 7 and 7 are arranged in series so that the smaller-diameter sides 9 and 9 face each other and the electrode parts 9a and 9a are connected by the connecting portion 34, and the electrode parts 8a and 8a at the larger-diameter sides 8 and 8 are connected respectively to the inverter circuit boards 13 and 13 that are the power sources. Also in this case, since the potential of the connecting portion 34 by which the electrode parts 9a and 9a are connected conforms to that of the fluorescent tube 7 at the low-voltage driving side, the same effect as the above-described fluorescent tube 7 can be obtained, whereby the luminance distribution in the longitudinal direction of the fluorescent tubes 7 and 7 can be evened out.

In FIG. 9B, the fluorescent tubes 7 and 7 are arranged in series so that the larger-diameter sides 8 and 8 face each other and the electrode parts 8a and 8a at the larger-diameter sides 8 and 8 are connected respectively to the inverter circuit boards 13 and 13 that are the power sources, and the electrode parts 9a and 9a at the smaller-diameter sides 9 and 9 are connected to a ground potential. As shown in FIG. 9B, the electrode parts 9a and 9a are at the low-voltage driving sides, so that the same effect as the above-described fluorescent tube 7 can be obtained, whereby the luminance distribution in the longitudinal direction of the fluorescent tubes 7 and 7 can be evened out. In addition, the same effect can be obtained by the configuration as shown in FIG. 9C such that one inverter circuit board 13 is used as a power source for driving, to which both the electrode parts 8a and 8a are connected. In addition, since the configurations shown in FIGS. 9A and 9B are such that the power sources for high-voltage driving have opposite phases, electric fields of the two fluorescent tubes 7 and 7 are cancelled out by each other, whereby the fluorescent tubes 7 and 7 are prevented from becoming a noise source.

The foregoing description of preferred embodiments and the implementation example of the present invention has been presented for purposes of illustration and description with reference to the drawings. However, it is not intended to limit the present invention to the preferred embodiments, and modifications and variations are possible as long as they do not deviate from the principles of the present invention.

Figure 10:
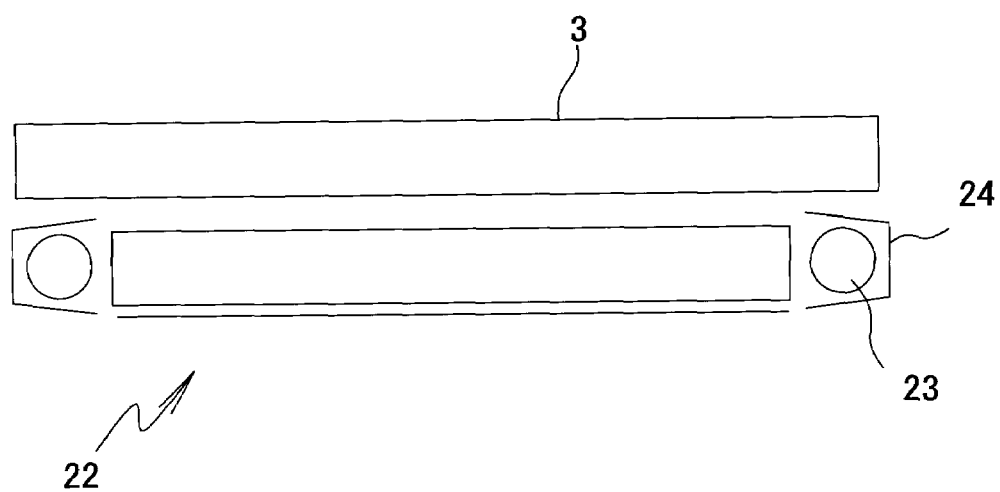
FIG. 10 is a view showing an example in which the fluorescent tube is used as a light source for an edge-lighting illuminating device for display device.

For example, the fluorescent tube according to the preferred embodiments of the present invention can be used as a light source 23 of an edge-lighting illuminating device 22 for display device shown in FIG. 10. Since such an illuminating device for display device has a configuration such that a cover-shaped lamp reflector 24 which is arranged to cover the light source 23 functions as an adjacent conductor to a large degree, the effects brought about by the fluorescent tube according to the preferred embodiments of the present invention are remarkable.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A fluorescent tube for one-side high-voltage driving, comprising:
    a pair of electrode parts; wherein
    an internal diameter of the fluorescent tube is arranged to become larger gradually toward one of the pair of electrode parts that is located at a high-voltage driving side.

2. An illuminating device for a display device comprising:
    the fluorescent tube according to claim 1; and
    optical sheets; wherein
    the fluorescent tube is arranged behind a display panel via the optical sheets.

3. A display device comprising the illuminating device for a display device according to claim 2.

4. The fluorescent tube according to claim 1, wherein the one of the pair of electrode parts located at a smaller-diameter side is arranged to be larger than the one of the pair of electrode parts located at the larger-diameter side.

5. The fluorescent tube according to claim 2, wherein the one of the pair of electrode parts located at the smaller-diameter side is arranged to be larger in length not in diameter than the one of the pair of electrode parts located at the larger-diameter side.

6. A method of driving a fluorescent tube including a pair of electrode parts and having a structure such that an internal diameter of the fluorescent tube becomes larger gradually toward one of the pair of electrode parts that is located at a high-voltage driving side, the method comprising the steps of:
    electrically connecting the electrode parts at smaller-diameter sides of the fluorescent tube; and
    connecting the electrode parts at larger-diameter sides of the fluorescent tube respectively to power sources for high-voltage driving.

7. The method of driving the fluorescent tube according to claim 6, wherein a connecting portion, by which the electrode parts at the smaller-diameter sides of the fluorescent tube are electrically connected, is prevented from being grounded to a ground potential.

8. The method of driving the fluorescent tube according to claim 6, wherein the power sources for high-voltage driving, to which the electrode parts at the larger-diameter sides of the fluorescent tube are respectively connected, have opposite phases.

* * * * *